Nov. 2, 1937.   P. T. FARNSWORTH ET AL   2,098,000
LUMINESCENT SCREEN
Original Filed May 31, 1932
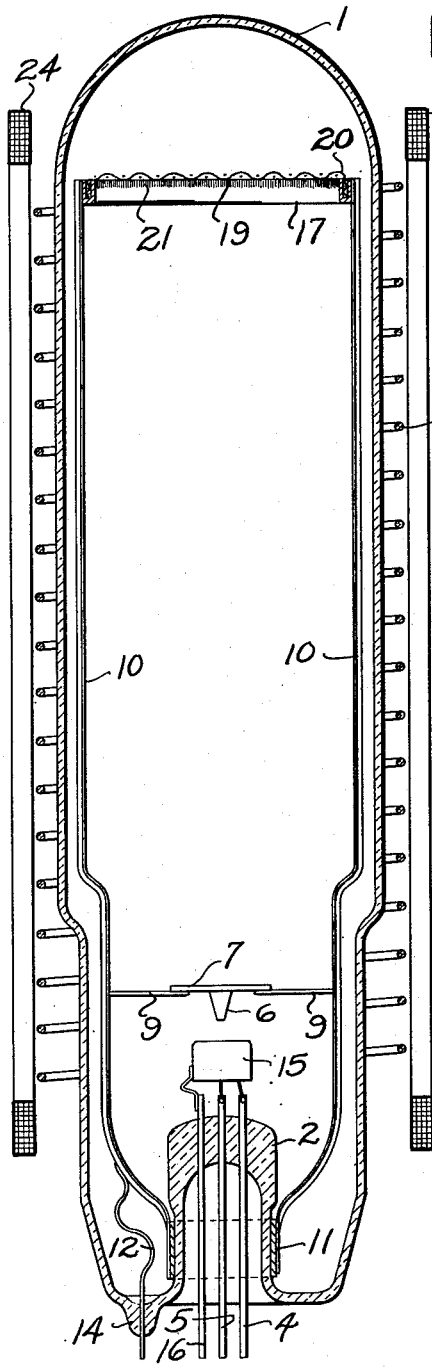
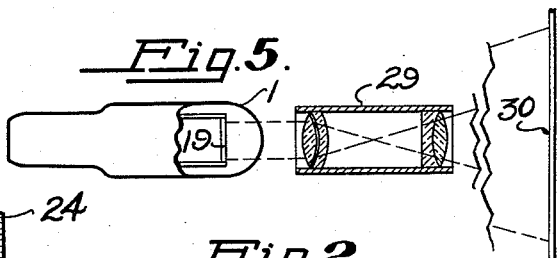
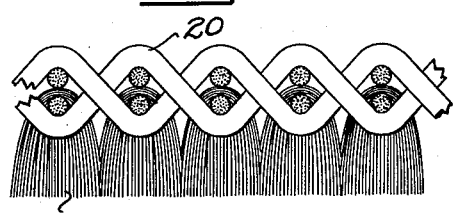
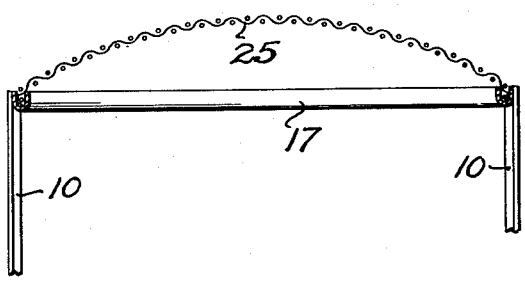
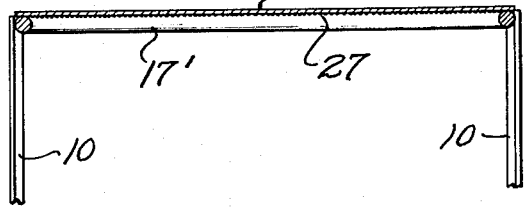
INVENTORS,
BERNARD C. GARDNER.
PHILO T. FARNSWORTH.
BY
ATTORNEYS.

Patented Nov. 2, 1937

2,098,000

UNITED STATES PATENT OFFICE 2,098,000

LUMINESCENT SCREEN

Philo T. Farnsworth, San Francisco, Calif., and Bernard C. Gardner, Philadelphia, Pa., assignors to Farnsworth Television Incorporated, San Francisco, Calif., a corporation of California Substitute for application Serial No. 614,501, May 31, 1932. This application May 6, 1936, Serial No. 78,188

12 Claims. (Cl. 250—27.5)

This invention relates to luminescent screens for use in cathode ray apparatus, such as oscilloscope or oscillograph tubes, and oscillights or television receiver tubes. The invention embodies the broad method disclosed and claimed in the copending application of Philo T. Farnsworth, Serial No. 655,784, filed February 8, 1933, and the present application is a substitution for our prior application, Serial No. 614,501, filed May 31, 1932.

Among the objects of the invention are: to provide a luminescent screen giving a pure white light; to provide a screen which may be luminously excited to a greater degree than the known screens of the fluorescent type; to provide a screen whereon the trace of a cathode ray beam is clearly defined, without appreciable shading off through lower degrees of luminescence adjacent the actual path of the ray; to provide a screen which is stable and of relatively long life; to provide a screen which is strong enough mechanically to withstand the shocks and jars of ordinary use; and to provide a screen which is susceptible of commercial production.

Other objects of this invention will be apparent or will be specifically pointed out in the description forming a part of this specification, but we do not limit ourselves to the embodiment of the invention herein described, as various forms may be adopted within the scope of the claims.

Referring to the drawing:

Figure 1 is a longitudinal sectional view through an oscillight or television receiver tube embodying this invention.

Figure 2 is a sectional view on a larger scale through the luminescent screen shown in Figure 1.

Figures 3 and 4 are sectional views illustrating modified forms of the screen of our invention.

Figure 5 is a diagram showing our invention used as a light source for picture projection.

For many years it has been customary to form the luminescent screen used in cathode ray oscillographs and the like, of materials which fluoresce under the bombardment of the rays, such as calcium tungstate or barium platinum cyanide, with or without an admixture of a phosphorescent material such as zinc sulphide. Luminescent screens of this character have the advantage of very great luminous efficiencies with low input power. Where the electron stream carries relatively low current and travels with moderate velocity, its trace on the screen is clearly visible under conditions of moderate external illumination. If, however, the attempt is made to increase the illumination beyond a certain very moderate limit, only slight increases are obtained even with very great increases in the input power, and there is a strong tendency for the material of the screen to break down and become inactive under the bombardment. Moreover, the light from the screen is usually very definitely colored, usually having a bluish or greenish tinge which makes it undesirable for television use, where a definite esthetic effect is aimed at. The purpose of this invention is to provide a screen which shows the trace of the cathode ray beam in pure white light, and which is capable of almost indefinite increases in the amount of power which it transforms into visible radiation. Although the method here employed is less sensitive on small power inputs than is the fluorescent screen, we have found that with large power inputs the efficiency may approach that of the conventional screen, giving an output power vastly greater than is possible with conventional methods.

Considered from the aspect of the apparatus employed, our invention comprises the combination with a source of cathode rays of a screen having a surface of refractory material which is capable of being raised to incandescence by the impact of the rays, this material being so disposed as to prevent material thermal conduction to adjacent portions of the surface, i. e., so disposed that the heat loss from an incandescent surface element by radiation is greater than its loss by conduction to adjacent surface elements. These requirements of the screen are met in sufficient degree to be operative by a sufficiently thin sheet of refractory metal of low thermal conductivity, such as a sheet of molybdenum foil, but the luminous efficiency in this case is low. The preferred type of screen is formed by impregnating a pile fabric, such as a finely woven short pile rayon velvet, with salts of a metal or metals whose oxides are poor emitters of infrared or heat rays, and then oxidizing the screen, burning out the fabric and converting the salts to the oxides. Salts of calcium, magnesium, thorium, cerium, zirconium and uranium are examples of the class of materials used to impregnate the fabric, the preferred combination being a mixture of thorium with a small amount of uranium. Screens of this type, bombarded from the pile side and preferably viewed from the same side, are capable of radiating at a rate of about two candlepower per watt input. Screens based on pileless fabrics lie intermediate the velvet base and the metal foil screens in sensitivity and speed of response.

Considered from the point of view of the method involved, the invention comprises, broadly, the steps of generating a pencil or beam of cathode rays, directing the rays against a screen of refractory material so as to raise the point of impact to incandescence, and deflecting the beam so that it impinges upon successive elementary areas of the screen, while preventing material transfer of heat between the incandescent elements and adjacent elements.

The form of the invention illustrated in the drawing comprises the usual evacuated envelope 1 having at one end a reentrant stem 2, which carries an electron gun. The type of gun used is preferably that shown in detail in the copending application of Gardner and Brolly, Serial No. 614,500, filed May 31, 1932, this form of cathode ray projector being capable of producing a cathode ray beam of high intensity. The cathode (not shown) is heated by current supplied through leads 4 and 5, emitting electrons which are attracted by the conical projection 6 on a circular anode 7, and pass through a beam canal in the anode to form the required beam of cathode rays. A pair of supports 9 connect the anode to longitudinal struts 10, preferably of curved cross section, which extend almost the full length of the tube and which are welded or otherwise secured at their lower ends to a clamp ring 11, surrounding the stem 2. A lead wire 12 connects to one of the anode supports and is brought out through a separate side seal 14, to permit the necessary positive potential to be supplied to the anode.

The intensity of the beam is regulated by a control electrode or grid 15, mounted on a lead 16 sealed through the stem.

The longitudinal support rods 10 carry, at their upper or distal ends, a ring 17 which supports the luminescent screen 19. The ring 17 is of U-shaped cross section, the arms of the U being crimped to hold the fabric 20 upon which the screen is formed. This is preferably a cut rayon velvet of very fine weave and short pile, the general rule being the finer the weave the more satisfactory the screen. The fabric is mounted with the pile 21 toward the electron gun. It is impregnated with a mixture of salts whose oxides form the light emitters or radiators of the completed screen. These materials are preferably a mixture whose basic radicals comprise approximately 99 per cent thorium and 1 per cent uranium. To this may be added a small proportion of aluminum and/or beryllium salt. In general, the salts used are nitrates, because of their high degree of solubility and the ease with which they are converted into the oxide.

The fabric is thoroughly impregnated with the salt solution, is thoroughly dried, and is then oxidized or "burnt off" in the same manner as is the ordinary incandescent gas mantle. In this process practically all of the original material of the fabric is removed, leaving a structure of oxide crystals or particles which retains the general form of the original fabric matrix. A large shrinkage occurs in the process, so that a 200 mesh fabric becomes, after burning, an oxide fabric with a mesh of about 500 to the inch. In forming the screen, allowance must be made for this shrinkage, the fabric being very slack as originally mounted.

As indicated above, various other oxides and oxide mixtures are possible. The usual gas mantle mixture of thoria and ceria has the disadvantage that it is unstable under bombardment, the thoria being reduced to render the screen inactive. Pure thoria is not subject to this limitation, but is not as sensitive as when sensitized by the uranium oxide.

The various other radiators mentioned, such as lime or calcium oxide, zirconium oxide, etc., will operate, but at greatly less efficiency, as compared with the preferred mixture.

The type of electron gun used is highly efficient, delivering as much as 80 per cent of the total emission of the cathode into the active electron stream, and cathode ray beams carrying as much as 10 milliamperes are readily producible. For television use, the beam is focused by the magnetic field produced by passing direct current through a coil 22, which is coaxial with the beam, so that the entire electron emission of the beam falls upon the screen as a very fine spot or trace.

The beam is systematically deflected by the magnetic field produced by passing an alternating current through the coils 24, so that the beam sweeps across the screen from side to side and falls only instantaneously upon any given elementary area. A similar set of coils arranged at right angles to the coils 24 is also used to deflect the beam in the opposite direction, this additional pair of coils being omitted in the figure for the sake of clarity.

When an alternating current of a different frequency from that passed through the coils 24 is passed through the second set of coils, the trace of the ray will describe a rectangular area upon the screen, traversing each element of the field successively. In practice, an anode potential of 5,000 to 7,000 volts is used, so that from 50 to 70 watts are expended in the beam, and this power is manifested in heating of the screen.

Since the individual fibers of the pile 21 are spaced from the adjacent fibers, the heat generated in the fibers by the impact of the beam is lost almost entirely by radiation, conduction to the adjacent fibers occurring necessarily through the body of the fabric, and being very small due to the low thermal conductivity of the oxide and to its small cross section transverse to the direction of the heat flow.

Since radiation is practically the only channel of heat loss, and since a large amount of power is expended in the extremely small mass of the pile fibers, they are excited to incandescence almost instantaneously. Once excited, they continue to incandesce until the loss of heat by radiation, continuing over a materially greater period than the excitation period, reduces them to darkness.

Using the finest weave velvets as a base, these screens have been satisfactorily operated to display pictures having a detail corresponding to 400 lines, i. e., pictures wherein the area of the focal spot was but 1/160,000 of the area of the screen. With these pictures transmitted at a rate of twenty per second, the time during which any individual area is bombarded is 1/3,200,000 of a second, the excitation occurring twenty times per second. Screens based on coarser fabric are correspondingly slower, but in any case the heating period is extremely short in comparison with the radiating period, so that the heating period may be considered as instantaneous.

If a plain fabric 25, as shown in Figure 3, be substituted for the pile fabric, the screen becomes too slow for satisfactory television use, although it is still sufficiently rapid for even the most rapid ordinary oscillographic work. Where, as in Figure 4, a metal foil 26, mounted upon a ring 17', and having its inner space coated with particles of a suitable emitter is used, the heat of the screen is still further reduced, although it may be used for producing oscillographic traces of simple wave forms. The omission of the oxide coating 27 still further reduces the sensitivity of the screen. These forms of the device will therefore not be generally used, owing to the much greater power available in screens of the preferred type, but they are disclosed here primarily to indicate the continuous gradation of characteristics that may be obtained by utilizing the principles here set forth to a greater or less degree.

It will be seen that the success or failure of a screen of the type here described depends on the proper coordination of heat generation and heat dissipation from the incandescent elements of the surface. The effect of a cathode ray beam in heating the anode has long been known, and modern X-ray tubes are customarily operated with their anodes at incandescence. In this case, however, the beam falls constantly on one spot, and the heat generated diffuses quickly throughout the massive target.

In the screen of our invention, however, the beam is constantly moved from one elementary area to another, and the mass of material in the path of the beam at any instant is so small that its rise to incandescence is practically instantaneous. Furthermore, conduction to adjacent elements is so restricted that heat loss by radiation cools the bombarded area before the incandescence can spread appreciably. Were the heat supplied continuously to one spot there would, of course, be spreading of the luminous area no matter how great the thermal resistance. The practically continuous movement of the trace is, therefore, an essential feature in the operation of a screen of this character.

With screens of the pile type, the illumination produced is of the order of 2 candle-power per watt of input energy. With 70 watts input the television picture produced on a screen of this type an inch and a half to two inches square, is so brilliant that the screen cannot be viewed directly. It may, however, be projected by a suitable lens system 29, as shown in Figure 5, upon a projection screen 30 or flat surface having a high coefficient of reflection. Under these circumstances the effect of the illumination produced is substantially twice to four times that available with home moving-picture outfits using a 100 watt lamp. The actual luminous flux produced is, of course, much less than that of the home projection outfit, but in the case of the screen of our invention it is the image of the luminous source itself which is projected, whereas in the case of the moving-picture film approximately 90 per cent of the infalling light is absorbed by the film. It is therefore possible, using screens of this type, to project television images in rooms having a fair degree of general illumination, and to a size of from one to five feet square, depending upon the general illumination level and the amount of the power expended in the cathode ray beam.

We claim:

1. In cathode ray apparatus, the combination of an envelope containing a cathode and an anode cooperating to produce a beam of cathode rays, and woven fabric of refractory material having a pile surface positioned to be bombarded by said beam.

2. In cathode ray apparatus, the combination of an envelope containing a cathode and an anode cooperating to produce a beam of cathode rays, and a screen comprising an opaque textile fabric of refractory material positioned to be bombarded by said beam and made luminous thereby.

3. In a cathode ray apparatus, the combination of an envelope containing a cathode and an anode cooperating to produce a beam of cathode rays, and an opaque pile surface textile fabric of refractory material so positioned with respect to said beam that the pile side of said fabric is subjected to bombardment from said beam.

4. In a cathode ray apparatus, the combination of an envelope containing a cathode and an anode cooperating to produce a beam of cathode rays, a screen adapted to be bombarded by said beam comprising intermingled and otherwise unsupported filamentous fragments of refractory material, and means for deflecting said beam across said screen to create an image larger than the cross section of said beam.

5. In a cathode ray apparatus, the combination of an envelope containing a cathode and an anode cooperating to produce a beam of cathode rays, a screen adapted to be bombarded by said beam comprising filamentous fragments of thorium oxide, and means for deflecting said beam across said screen to create an image larger than the cross section of said beam.

6. In a cathode ray apparatus, the combination of an envelope containing a cathode and an anode cooperating to produce a beam of cathode rays, and a screen adapted to be bombarded by said beam comprising interlocked and otherwise unsupported filamentous fragments of refractory material having end portions directed toward said anode, said fragments being of such small dimension as related to said beam as to be capable of being raised to incandescence thereby practically instantaneously.

7. Means for creating a visual image, comprising an envelope containing an anode and cathode cooperating to produce an electron beam, an opaque refractory textile fabric capable of being raised to incandescence by the impact of said beam, and means for moving the beam across said screen to create an image larger than the cross section of said beam.

8. Cathode ray apparatus comprising an envelope containing an opaque refractory oxide textile fabric, and means for raising successive elemental areas of said fabric to incandescence to produce an image.

9. In a cathode ray tube having an envelope containing a cathode and anode cooperating to produce a cathode ray beam, a refractory textile fabric screen positioned to be bombarded to incandescence by said beam and supported solely at the edges thereof.

10. A screen for a cathode ray tube, consisting solely of interlaced filamentous refractory incandescible material, and having substantially closed interspaces.

11. A cathode ray tube comprising an envelope containing a luminescent screen of woven refractory material and having one surface thereof formed from the cut ends of threads, and means for bombarding said cut ends with an electron beam of sufficient intensity to raise at least the end portions of said threads to incandescence.

12. In a cathode ray apparatus, the combination of an envelope containing a cathode and an anode cooperating to produce a beam of cathode rays, a screen adapted to be bombarded by said beam comprising filamentous fragments of thorium oxide positioned with a plurality of cut ends presented to said beam, and means for deflecting said beam across said screen to create an image larger than the cross section of said beam.

PHILO T. FARNSWORTH.
BERNARD C. GARDNER.